(12) United States Patent
Inakura

(10) Patent No.: US 8,401,375 B2
(45) Date of Patent: Mar. 19, 2013

(54) RECORDING APPARATUS, RECORDING METHOD, PROGRAM FOR IMPLEMENTING THE METHOD, AND STORAGE MEDIUM STORING THE PROGRAM

(75) Inventor: Keita Inakura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 2262 days.

(21) Appl. No.: 10/458,412

(22) Filed: Jun. 11, 2003

(65) Prior Publication Data

US 2004/0028377 A1 Feb. 12, 2004

(30) Foreign Application Priority Data

Jun. 19, 2002 (JP) ................................. 2002-178334

(51) Int. Cl.
*H04N 5/92* (2006.01)
*H04N 5/917* (2006.01)
*H04N 5/76* (2006.01)
(52) U.S. Cl. .................... 386/326; 386/330; 386/295
(58) Field of Classification Search ............... 386/45–46, 386/95, 111, 326, 330, 328, 329, 334, 333, 386/294, 295
See application file for complete search history.

(56) References Cited

U.S. PATENT DOCUMENTS

| | | | |
|---|---|---|---|
| 6,285,632 B1 * | 9/2001 | Ueki | 379/32.01 |
| 6,353,704 B1 * | 3/2002 | Nakatani et al. | 386/334 |
| 6,584,272 B1 * | 6/2003 | Fukushima et al. | 386/230 |
| 6,642,939 B1 * | 11/2003 | Vallone et al. | 715/721 |
| 7,209,639 B2 | 4/2007 | Azuma | 386/80 |
| 7,212,725 B2 * | 5/2007 | Gunji et al. | 386/243 |
| 7,962,011 B2 * | 6/2011 | Plourde et al. | 386/295 |
| 2002/0046407 A1 * | 4/2002 | Franco | 725/110 |
| 2003/0031468 A1 * | 2/2003 | Ono et al. | 386/109 |
| 2003/0093260 A1 * | 5/2003 | Dagtas et al. | 704/1 |

\* cited by examiner

*Primary Examiner* — Robert Chevalier
(74) *Attorney, Agent, or Firm* — Fitzpatrick, Cella, Harper & Scinto

(57) ABSTRACT

There is provided a recording apparatus that is capable of avoiding the deletion of contents, which is important to the user, due to overwriting of the contents and degradation in reproduction quality due to recompression thereof, by allowing the user to selectively delete unnecessary contents by himself or herself using a deleting contents selection screen displayed to the user when there is little remaining recording capacity on a recording medium. The recording apparatus records information data on a recording medium at a plurality of different recording data rates. A recording data rate of the information data selected from the plurality of different recording data rates is set. A recordable time period is detected based on the set recording data rate and an information quantity of information data that has already been recorded on the recording medium. Recordable time period information indicative of the detected recordable time period is displayed.

39 Claims, 6 Drawing Sheets

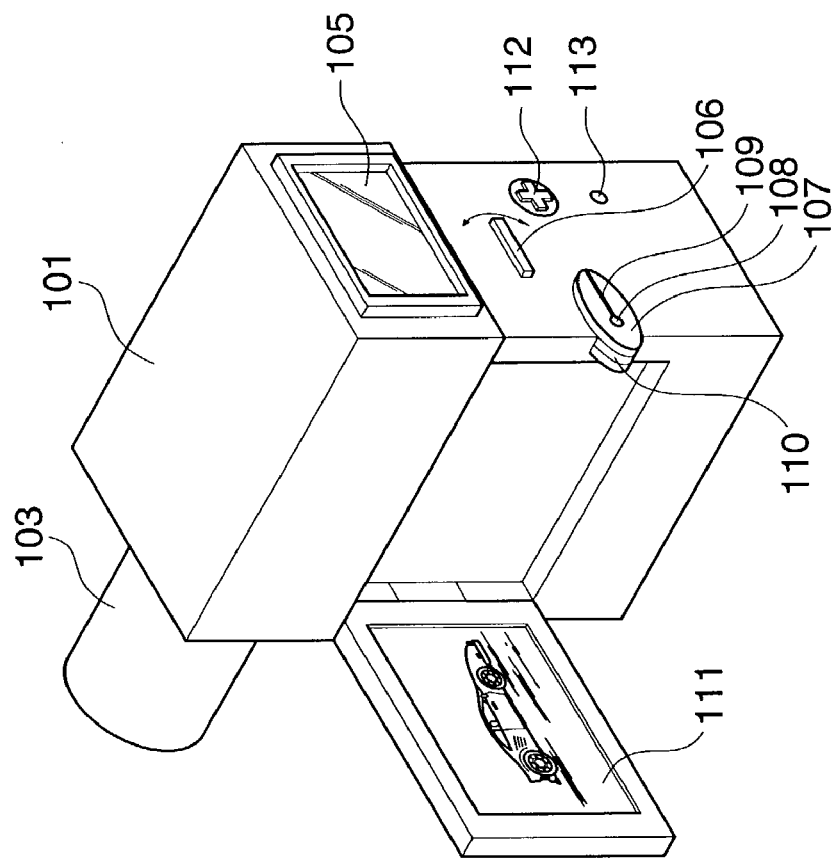
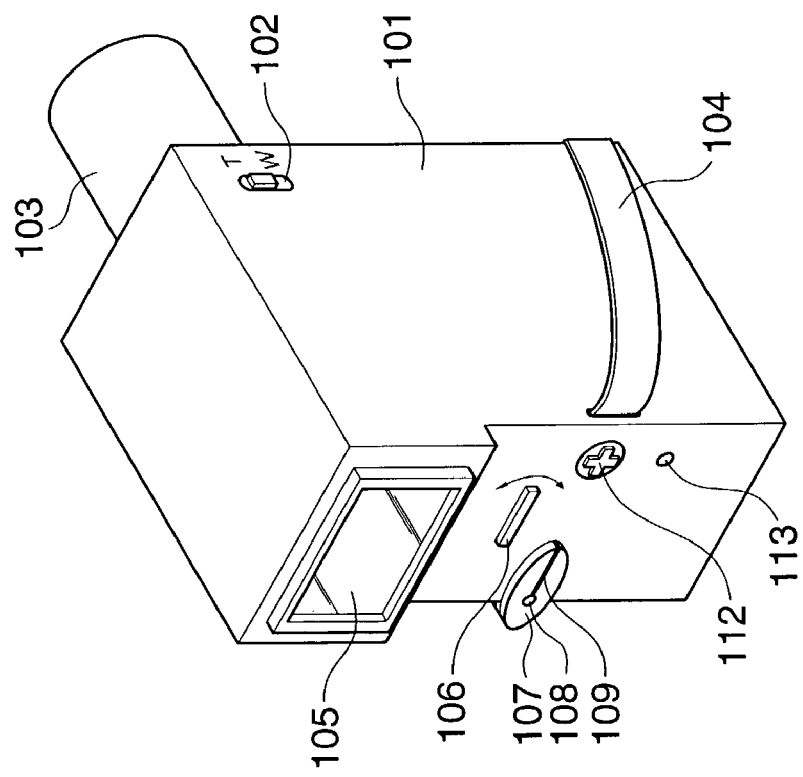

| | |
|---|---|
| 501 | RECORDING DATE |
| 502 | RECORDING START TIME |
| 503 | RECORDING TIME LENGTH |
| 504 | TYPE OF FILE |
| 505 | RECORDING SIZE |

RECORDING APPARATUS, RECORDING METHOD, PROGRAM FOR IMPLEMENTING THE METHOD, AND STORAGE MEDIUM STORING THE PROGRAM

BACKGROUND OF THE INVENTION

1. Field of the Invention

The present invention relates to a recording apparatus and a recording method which record information signals at different recording data rates, a program for implementing the method, and a storage medium storing the program.

2. Description of the Related Art

Moving image pickup apparatus (recording and reproducing apparatuses) that record moving image data in the form of digital data onto randomly accessible storage media, such as magneto-optical disks, have been brought into practical use. When moving image data is recorded as digital data, the amount of data can be reduced and recording can be performed for a longer time period by compressing the data using a moving image compression method, as represented by AVI ("Audio Visual Interleaved": a moving image format of digital moving image editing software that was developed by MICROSOFT CORPORATION of the U.S.A.) and MPEG (Motion Picture Experts Group).

However, with these conventional apparatuses, when there is little free capacity for recording remaining on the storage medium but the user wishes to continue recording for a little time, the only way to extend the recording time period is to replace the recording medium, and there has been the problem that it is not possible to perform recording while the recording medium is being replaced.

To solve this problem, in the case where there is little remaining capacity for recording on the storage medium during recording, there have been proposed a method in which the recording time period is extended by overwriting old files out of the files that have already been recorded on the storage medium and a method in which an increased remaining recording capacity is secured by recompressing data of existing files at a higher compression ratio.

However, with the above proposed methods, there is a problem (first problem) that the file to be overwritten or the file to be recompressed is automatically determined, so that there are cases where contents that are important to the user are deleted or recompressed.

Further, when the user is allowed to specify the contents to be deleted or recompressed, he/she can know the recording time period and the data size of the specified contents. However, when it is possible to freely set the compression ratio for recording out of a plurality of compression ratios, it can be envisaged that the compression ratio that was used when recording contents differs from the compression ratio used for currently recording data, so that the length of time over which recording can be performed using the same data size may vary.

However, there has been no technique for knowing, from contents to be deleted, what degree of extension in recording time period can be expected by deleting the contents. For this reason, when the user deletes contents, it is necessary to know not the actual reproduction time period of the contents but how long recording can be performed at the compression ratio that is presently set, and therefore there is demand for a technique that can satisfy such requirement (second problem).

SUMMARY OF THE INVENTION

It is a first object of the present invention to provide a recording apparatus and a recording method that are capable of avoiding the deletion of contents, which are important to the user, due to overwriting of the contents and degradation in reproduction quality due to recompression thereof, by allowing the user to selectively delete unnecessary contents by himself or herself using a deleting contents selection screen displayed to the user when there is little remaining recording capacity on a recording medium, as well as a program for implementing the method, and a storage medium storing the program.

It is a second object of the present invention to provide a recording apparatus and a recording method that enable the user to select appropriate contents for deletion or overwriting in accordance with the desired extension in the recording time period, as well as a program for implementing the method, and a storage medium storing the program.

To attain the above objects, in a first aspect of the present invention, there is provided a recording apparatus for recording information data on a recording medium at a plurality of different recording data rates, comprising a setting device that sets a recording data rate of the information data selected from the plurality of different recording data rates, a detecting device that detects a recordable time period based on the recording data rate set by the setting device and an information quantity of information data that has already been recorded on the recording medium, and a display device that displays recordable time period information indicative of the recordable time period detected by the detecting device.

Preferably, the recording apparatus according to the first aspect further comprises a compressing device that compresses an information quantity of the information data, and wherein the compressing device determines a compression ratio based on the recording data rate set by the setting device.

Preferably, the detecting device further determines a remaining time period based on the recording data rate set by the setting device and recording remaining amount information indicative of a recording remaining amount of the recording medium, and the display device further displays remaining time period information indicative of the remaining time period.

More preferably, the display device displays the recordable time period information and the remaining time period information in a predetermined display format.

Also preferably, the display device displays remaining capacity information indicative of a remaining capacity acquired by adding the recordable time period and the remaining time period.

Preferably, a plurality of pieces of information data are recorded on the recording medium, and the detecting device detects the recordable time period for each of the plurality of pieces of the information data recorded on the recording medium, and the display device displays the recordable time period information indicative of the detected recordable time period of each of the plurality of pieces of information data.

Preferably, the recording apparatus according to the first aspect further comprises a reproducing device that reproduces the information data from the recording medium, and wherein the display device has a first display mode in which reproduction time period information indicative of a reproduction time period of the information data recorded on the recording medium is displayed, and a second display mode in which the recordable time period information related to the information data recorded on the recording medium is displayed.

More preferably, the recording apparatus according to the first aspect further comprises a mode setting device that selectively sets an operation mode of the apparatus from a recording mode and a reproduction mode, and the display device performs display in the first display mode when the mode setting device has set the reproduction mode and performs display in the second display mode when the mode setting device has set the recording mode.

Preferably, the detecting device includes a reproducing device that reproduces management information related to data recorded on the recording medium from the recording medium, and the detecting device detects the information quantity of the information data recorded on the recording medium based on the reproduced management information.

Also preferably, the information data includes image data.

To attain the above objects, in a second aspect of the present invention, there is provided a recording apparatus for compressing an information quantity of contents data at a plurality of different compression ratios and for recording the compressed contents data on a recording medium, comprising a setting device that sets a compression ratio of the contents data selected from the plurality of different compression ratios, a detecting device that detects, based on an information quantity of contents data that has already been recorded on the recording medium and the compression ratio set by the setting device, a recordable time period of the contents data to be acquired by deleting the contents data from the recording medium, and a display device that displays recordable time period information indicative of the recordable time period detected by the detecting device.

Preferably, a plurality of pieces of contents data are recorded on the recording medium, and the detecting device detects the recordable time period for each of the plurality of pieces of contents data, and the display device displays the recordable time period information indicative of the detected recordable time period for each of the plurality of pieces of contents data.

More preferably, the recording apparatus according to the second aspect further comprises a reproducing device that reproduces the plurality of pieces of contents data from the recording medium, and wherein the display device has a first display mode in which reproduction time period information indicative of reproduction time periods of the plurality of pieces of contents data recorded on the recording medium is displayed, and a second display mode in which the recordable time period information related to the plurality of pieces of contents data information recorded on the recording medium is displayed.

To attain the above objects, in a third aspect of the present invention, there is provided a recording apparatus for compressing an information quantity of contents data at a plurality of different compression ratios and for recording the compressed contents data on a recording medium, comprising a setting device that sets a compression ratio of the contents data selected from the plurality of different compression ratios, a detecting device that detects an information quantity of contents data that has already been recorded on the recording medium and acquires a recordable time period for the information quantity detected by the detecting device, for recording contents data by compressing at the compression ratio set by the setting device, and a display device that displays recordable time period information indicative of the acquired recordable time period.

Preferably, a plurality of pieces of contents data are recorded on the recording medium, and wherein the detecting device detects the recordable time period for each of the plurality of pieces of contents data, and the display device displays the recordable time period information indicative of the detected recordable time period for each of the plurality of pieces of contents data.

More preferably, the recording apparatus according to the first aspect further comprises a reproducing device that reproduces the plurality of pieces of contents data from the recording medium, the display device has a first display mode in which reproduction time period information indicative of reproduction time periods of the plurality of pieces of contents data recorded on the recording medium is displayed, and a second display mode in which the recordable time period information related to the plurality of pieces of contents data information recorded on the recording medium is displayed.

To attain the above objects, in a fourth aspect of the present invention, there is provided a recording apparatus for compressing an information quantity of contents data and for recording the compressed contents data on a recording medium at a plurality of different recording data rates, comprising a setting device that sets a recording data rate of the contents data selected from the plurality of different recording data rates, an acquiring device that acquires an information quantity of contents data that has already been recorded on the recording medium and a recording remaining amount of the recording medium, a calculating device that calculates a recordable time period, based on the recording data rate set by the setting device and a total of the information quantity of the contents data and the recording remaining amount acquired by the acquiring device, and a display device that displays recordable time period information indicative of the recordable time period calculated by the calculating device.

Preferably, a plurality of pieces of contents data are recorded on the recording medium, and the calculating device calculates the recordable time period based on the recording data rate set by the setting device and the total of the information quantity of the contents data and the recording remaining amount of one of contents data selected from the plurality of pieces of contents data.

Preferably, the calculating device calculates the recordable time period by dividing the total of the information quantity of the contents data and the recording remaining amount by the set recording data rate.

Preferably, the acquiring device includes a reproducing device that reproduces management information related to data recorded on the recording medium from the recording medium, and the acquiring device detects the information quantity of the contents data and the recording remaining amount based on the management information reproduced by the reproducing device.

To attain the above objects, in a fifth aspect of the present invention, there is provided a recording apparatus for compressing an information quantity of contents data and for recording the compressed contents data on a recording medium at a plurality of different recording data rates, comprising a setting device that sets a recording data rate of the contents data selected from the plurality of different data rates, a detecting device that detects, based on an information quantity of a plurality of pieces of contents data that have already been recorded on the recording medium and the recording data rate set by the setting device, an increase in a recordable time period for each of the plurality of pieces of contents data, to be acquired by deletion of each of the plurality of pieces of contents data from the recording medium, and a display device that displays recordable time information indicative of the recordable time period detected by the detecting device.

To attain the above objects, in a sixth aspect of the present invention, there is provided a recording method of recording information data on a recording medium at a plurality of different recording data rates, comprising a setting step of setting a recording data rate of the information data selected from the plurality of different recording data rates, a detecting step of detecting a recordable time period based on the recording data rate set in the setting step and an information quantity of information data that has already been recorded on the recording medium, and a display step of displaying recordable time period information indicative of the recordable time period detected in the detecting step.

To attain the above objects, in a seventh aspect of the present invention, there is provided a recording method of compressing an information quantity of contents data at a plurality of different compression ratios and recording the compressed contents data on a recording medium, comprising a setting step of setting a compression ratio of the contents data selected from the plurality of different compression ratios, a detecting step of detecting, based on an information quantity of contents data that has already been recorded on the recording medium and the compression ratio set in the setting step, a recordable time period of the contents data to be acquired by deleting the contents data from the recording medium, and a display step of displaying recordable-time period information indicative of the recordable time period detected in the detecting step.

To attain the above objects, in an eighth aspect of the present invention, there is provided a recording method of compressing an information quantity of contents data at a plurality of different compression ratios and recording the compressed contents data on a recording medium, comprising a setting step of setting a compression ratio of the contents data selected from the plurality of different compression ratios, detecting step of detecting an information quantity of contents data that has already been recorded on the recording medium and acquires a recordable time period for the information quantity detected in the detecting step, for recording contents data by compressing at the compression ratio set in the setting step, and a display step of displaying recordable time period information indicative of the acquired recordable time period.

To attain the above objects, in a ninth aspect of the present invention, there is provided a recording method of compressing an information quantity of contents data and recording the compressed contents data on a recording medium at a plurality of different recording data rates, comprising a setting step of setting a recording data rate of the contents data selected from the plurality of different recording data rates, an acquiring step of acquiring an information quantity of contents data that has already been recorded on the recording medium and a recording remaining amount of the recording medium, a calculating step of calculating a recordable time period, based on the recording data rate set in the setting step and a total of the information quantity of the contents data and the recording remaining amount acquired in the acquiring step, and a display step of displaying recordable time period information indicative of the recordable time period calculated in the calculating step.

To attain the above objects, in a tenth aspect of the present invention, there is provided a recording method of compressing an information quantity of contents data and recording the compressed contents data on a recording medium at a plurality of different recording data rates, comprising a setting step of setting a recording data rate of the contents data selected from the plurality of different data rates, a detecting step of detecting, based on an information quantity of a plurality of pieces of contents data that have already been recorded on the recording medium and the recording data rate set in the setting step, an increase in a recordable time period for each of the plurality of pieces of contents data, to be acquired by deletion of each of the plurality of pieces of contents data from the recording medium, and a display step of displaying recordable time information indicative of the recordable time period detected in the detecting step.

To attain the above objects, there is further provided a computer-readable program for causing a computer to implement the recording method according to each of the seventh to tenth aspects.

To attain the above objects, there is further provided a storage medium storing a computer-readable program for causing a computer to implement the recording method according to each of the seventh to tenth aspects.

The above and other objects, features, and advantages of the invention will become more apparent from the following detailed description taken in conjunction with the accompanying drawings.

BRIEF DESCRIPTION OF THE DRAWINGS

FIGS. 1A and 1B are perspective views showing the external appearance of a recording and reproducing apparatus according to an embodiment of the present invention, in which:

FIG. 1A shows the recording and reproducing apparatus as viewed from the side of a grip for holding the apparatus; and FIG. 1B shows the recording and reproducing apparatus as viewed from the side of an LCD unit that is attached to a side of the apparatus;

DETAILED DESCRIPTION OF THE PREFERRED EMBODIMENTS

Figure 2:
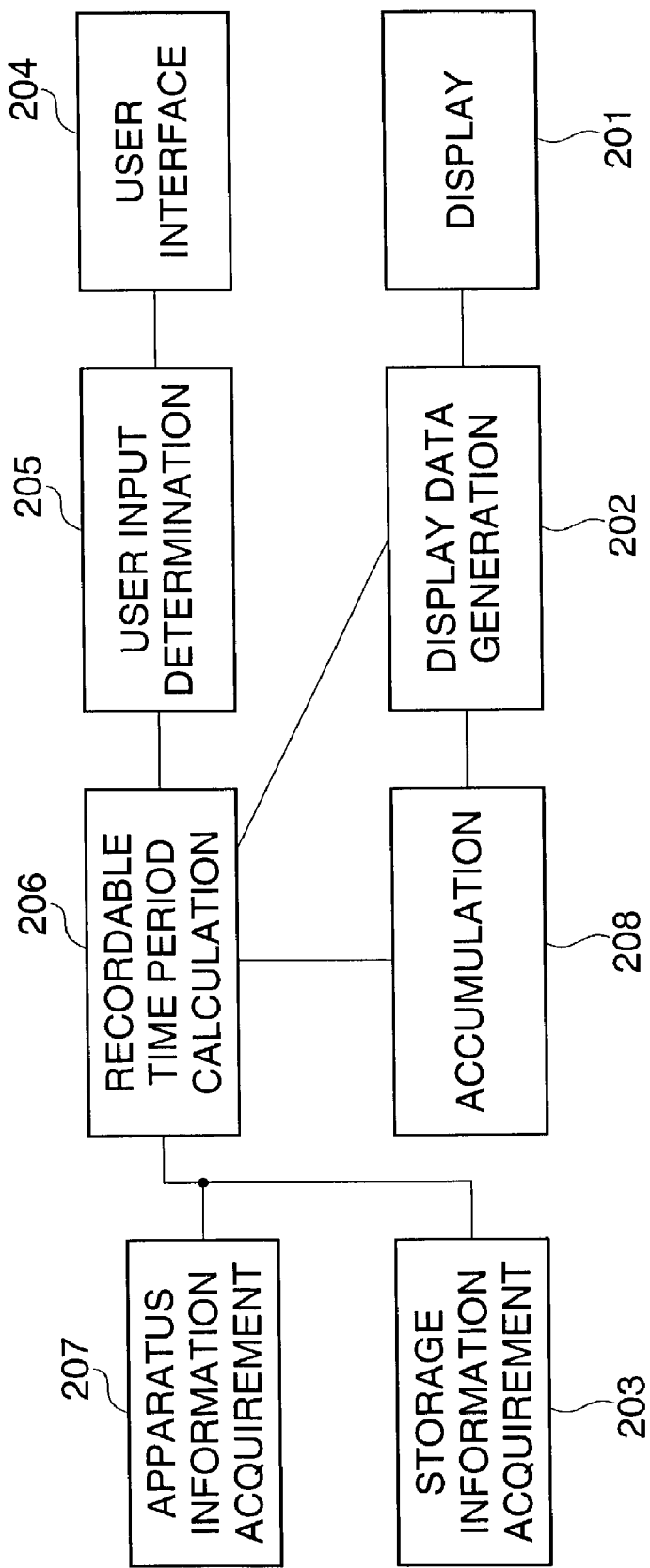
FIG. 2 is a schematic block diagram showing the arrangement of essential functional elements of the recording and reproducing apparatus of FIGS. 1A and 1B.

The present invention will now be described in detail with reference to the accompanying drawings showing preferred embodiments thereof.

FIG. 1A is a perspective view showing the external appearance of an example of a recording and reproducing apparatus according to an embodiment of the present invention, as viewed from the side of a grip for holding the recording and reproducing apparatus. The recording and reproducing apparatus according to the present embodiment is implemented as a video recorder using a randomly accessible recording medium such a magneto-optical disk, for example.

FIG. 1B is also a perspective view showing the external appearance of an example of a recording and reproducing apparatus, as viewed from the side of an LCD unit that is attached to a side of the recording and reproducing apparatus.

The recording and reproducing apparatus of FIGS. 1A and 1B is provided with a zoom switch 102, a lens unit 103, a wrist strap 104, a viewfinder 105, a position lock knob 106, a mode dial 107, an LCD unit 111 and so forth, which are arranged on various parts of a main body 101 of the apparatus.

The zoom switch 102 is a switch for changing the photographic magnification. Moving the zoom switch 102 to a "W" side in the figure results in wide-angle photography, while moving the zoom switch 102 to a "T" side in the figure results in telephoto photography. The lens unit 103 captures a subject image during photography. The wrist strap 104 is designed so that the back of a hand that holds the recording and reproducing apparatus is held by a belt. The viewfinder 105 is internally provided with a small-sized LCD and a magnifying lens, so that the user can confirm the photographed image by placing his or her eye near the viewfinder 105.

The mode dial 107 is composed of an operation switch that switches a shooting mode. By rotating a handle of the mode dial 107 that projects to the right in FIGS. 1A and 1B, it is possible to switch to one of a total of five photographic modes: "POWER OFF"; "VTR"; "CAMERA"; "PHOTO"; and "PROGRESSIVE SCAN". Here, the "PHOTO" mode is a mode in which still images are recorded on a recording medium which is a randomly accessible recording medium such a magneto-optical disk (a disk D shown in FIG. 7). The "POWER OFF" mode is a mode in which the power supply of the recording and reproducing apparatus is turned off. The "VTR" mode is a mode in which recording and reproducing of moving images are performed. The "CAMERA" mode is a standard camera mode in which an image signal is read from an image sensor, not shown, two lines at a time. The "PROGRESSIVE SCAN" mode is a mode in which an image signal is read from the image sensor one line at a time.

By setting the mode dial 107 at the mode "PROGRESSIVE SCAN", it is possible to switch from the standard camera mode mentioned above, in which two lines are read at a time to a mode in which one line is read at a time, so that it is possible to record each frame in a moving image with high image quality. Accordingly, the mode "PROGRESSIVE SCAN" is mainly used when high quality still images are to be extracted from moving image data.

The position lock knob 106 is for locking the setting of the mode dial 107. A start/stop button 108 is for instructing start and stop of recording. An unlock knob (unlock member) 109 is for releasing the lock of the mode dial 107. A mode dial base 110 serves to fix the mode dial 107 to the recording and reproducing apparatus main body 101. The LCD unit 111 is a display section for confirming images on a large screen. A cross button 112 is for facilitating user operations and displaceable upon being pressed at a desired position on the left, right, above, or below. A "YES" button 113 is for making decisions (that is, for deciding user operations).

Next, the arrangement and basic recording and reproducing operation of the recording and reproducing apparatus according to the present embodiment will be described.

Figure 7:
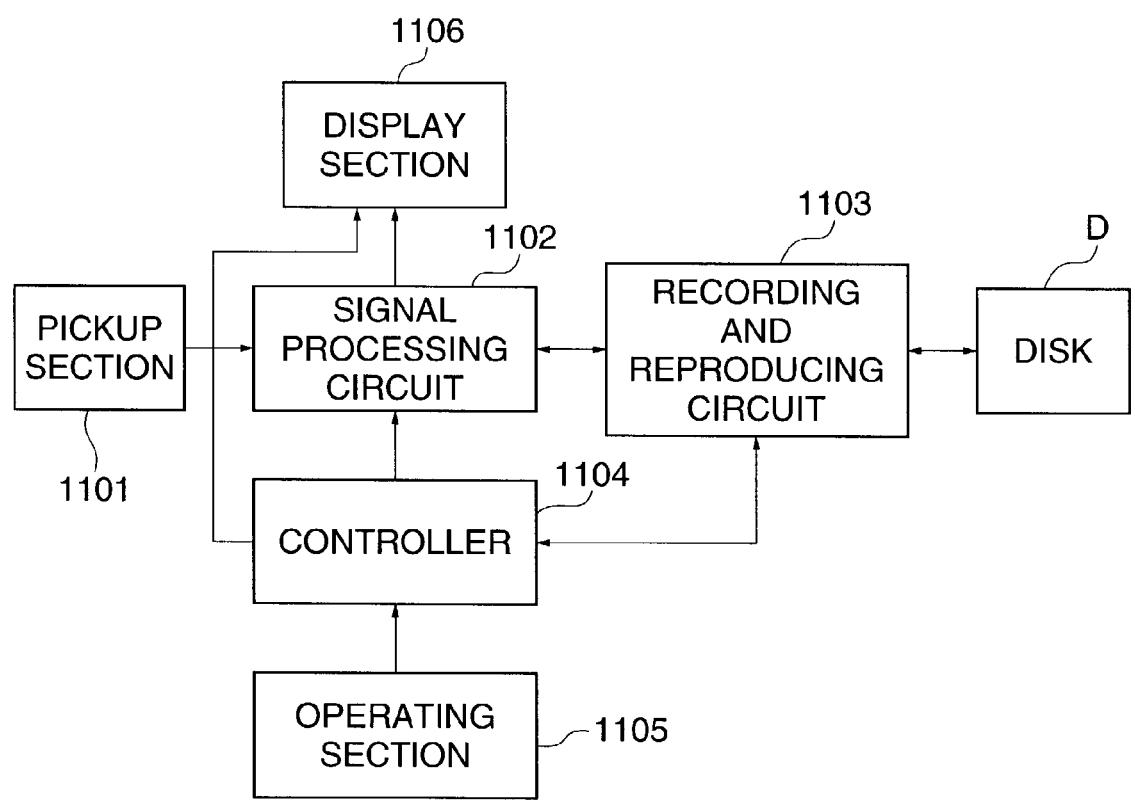
FIG. 7 is a block diagram showing the hardware arrangement of the recording and reproducing apparatus of FIGS. 1A and 1B.

FIG. 7 is a block diagram showing the arrangement of the recording and reproducing apparatus. The recording and reproducing apparatus is comprised of an image pickup section 1101, a signal processing circuit 1102, a recording and reproducing circuit 1103, a controller 1104, an operating section 1105, a display section 1106, and the disk D.

The image pickup section 1101 includes the lens unit 103 mentioned above and an image sensor, and is used to shoot a subject. The signal processing circuit 1102 encodes (compresses) a moving image signal from the image pickup section 1101 in accordance with a conventional standard such as MPEG, to reduce the information quantity of the encoded signal. The recording and reproducing circuit 1103 performs processing for adding additional information, such as a header, that contains information, such as a recording mode, file size, recording date and time, to the encoded moving image data and records the encoded moving image data onto the disk D, or processing for reproducing image data that has been recorded onto the disk D. The data recorded onto the disk D by the present invention may be moving image data or audio data.

The controller 1104 controls compression operations by the signal processing circuit 1102, recording and reproducing operations by the recording and reproducing circuit 1103, and display operations by the display section 1106. Further, the controller 1104 executes a process shown by a flowchart in FIG. 6 that will be described later. The operating section 1105 includes the zoom switch 102, the mode dial 107, the start/stop button 108, the cross button 112, the "YES" button 113, and so forth, in FIG. 1 that were described above, and operates when the user performs various settings and operations. The display section 1106 includes the LCD unit 111 in FIG. 1, and displays moving images picked up by the image pickup section 1101, a reproducing file selection screen (see FIG. 3), a deleting contents selection screen (see FIG. 4), and so forth. The disk D is used for recording and reproducing image data by the recording and reproducing circuit 1103.

First, the processing performed by the recording and reproducing apparatus during recording will be described. When a recording mode is set by the operating section 1105, a moving image signal outputted from the image pickup section 1101 is inputted to the signal processing circuit 1102 and is displayed by the display section 1106 (including the LCD unit 111 in FIG. 1). Here, when an instruction for a moving image recording start is given by the operating section 1105, the controller 1104 controls the signal processing circuit 1102 to encode the moving image signal outputted from the image pickup section 1101 in accordance with a conventional standard such as MPEG to reduce the information quantity of the encoded moving image signal. In the present embodiment, a plurality of recording modes, which have different target data rates during recording, are provided, and the user can set one out of these recording modes by operating the operating section 1105. For example, in the present embodiment, there are three recording modes (compression modes) whose respective target data rates are 12Mbps, 6Mbps, and 3Mbps.

In accordance with the recording mode set by the operating section 1105, the controller 1104 changes the compression ratio for encoding by the signal processing circuit 1102. Also, the signal processing circuit 1102 extracts a predetermined frame from the moving image signal, such as a first or start frame , reduces the size of the frame to generate thumbnail image data, and sends the thumbnail image data to the recording and reproducing circuit 1103. A moving image data sequence that has been encoded by the signal processing circuit 1102 is sent to the recording and reproducing circuit 1103. The recording and reproducing circuit 1103 adds additional information, such as a header, that contains the recording mode, the file size, the date and time of recording, and so forth, to the encoded moving image data and records the encoded moving image data onto the disk D. At this time, the recording and reproducing circuit 1103 also stores the thumbnail image data in the header.

The recording and reproducing circuit 1103 also reproduces management information, which is called a TOC (Table of Contents) and includes information related to recorded data such as the recording position, file name and file size of each file on the disk D, from the disk D and outputs the management information to the controller 1104. Based on this management information, the controller 1104 can detect the states of the files recorded on the disk D and a free capacity on the disk D. If a recording stop instruction is given in this state, the controller 1104 outputs an instruction for stopping recording to the signal processing circuit 1102 and the recording and reproducing circuit 1103. Responsive to this instruction, the recording and reproducing circuit 1103 adds additional information, such as a footer, to the moving image data and completes the recording of the moving image data sequence from the recording start to the recording stop as a single file.

The recording and reproducing apparatus of the present embodiment is also provided with a still image recording mode.

Specifically, when a still image recording instruction is issued from the operating section 1105 while a moving image from the image pickup section 1101 is being displayed by the display section 1106, the controller 1104 outputs an instruction to the signal processing circuit 1102 to cause the same to extract an image signal for one frame that has been inputted at that time point and store the extracted image signal in an internal memory. The signal processing circuit 1102 encodes the image signal for this single frame using an encoding method such as JPEG (Joint Photographic Experts Group), and outputs the encoded image signal to the recording and reproducing circuit 1103. The signal processing circuit 1102 simultaneously generates thumbnail image data of this still image data. The recording and reproducing circuit 1103 adds additional information, including the thumbnail image data, to the encoded still image data and records the encoded still image data onto the disk D.

Next, processing during reproduction will be described. When a reproduction mode is set by the operating section 1105, the controller 1104 controls the recording and reproducing circuit 1103 to instruct reproduction of the thumbnail images of the files recorded on the disk D. The thumbnail image data reproduced by the recording and reproducing circuit 1103 is sent to the signal processing circuit 1102. The signal processing circuit 1102 generates a thumbnail list screen using this thumbnail image data and displays the thumbnail list screen on the display section 1106.

The user confirms the thumbnail list screen and selects a thumbnail image corresponding to a desired file using the operating section 1105. The controller 1104 controls the recording and reproducing circuit 1103 and the signal processing circuit 1102 to reproduce a file that corresponds to the thumbnail image that has been selected. The recording and reproducing circuit 1103 reproduces the specified file from the disk D and outputs the file to the signal processing circuit 1102. The signal processing circuit 1102 decodes the image data sequence of the file that has been reproduced, and displays the data on the display section 1106.

It should be noted that the menu screens in FIGS. 3 and 4, described later, are displayed on the display section 1106 by the controller 1104 during a recording pause in the recording mode or in the reproduction mode when an instruction has been received from the user.

FIG. 2 is a block diagram showing the arrangement of essential functional elements of the recording and reproducing apparatus according to the present embodiment.

The recording and reproducing apparatus of the present embodiment is comprised of a display means 201, a display data generating means 202, a storage information acquiring means 203, a user interface 204, a user input determining means 205, a recordable time period calculating means 206, an apparatus information acquiring means 207, and an accumulating means 208.

Of these, the display means 201 corresponds to the display section 1106 in FIG. 7 and the user interface 204 corresponds to the operating section 1105 in FIG. 7. The display data generating means 202, the storage information acquiring means 203, the user input determining means 205, the recordable time period calculating means 206, the apparatus information acquiring means 207, and the accumulating means 208 correspond to the controller 1104 in FIG. 7 and the functions of programs executed by the controller 1104.

The user interface 204 has a function of informing the recording and reproducing apparatus of user operations and is implemented by hardware keys, such as operation keys on the recording and reproducing apparatus main body or a remote controller, and a GUI (Graphical User Interface) that is operated using a pointing device, such as a touch panel.

The user input determining means 205 determines the intention of a user input from the present state of the recording and reproducing apparatus and activates an operation of the recording and reproducing apparatus. For example, if the user performs a menu display operation during recording mode, a recording menu is displayed by the display means 201 and if the user performs a menu display operation during reproduction mode, a reproduction menu is displayed by the display means 201.

The recordable time period calculating means 206 calculates what degree of extension in the recording time period can be expected at the presently set compression ratio when contents that have been selected by the user are deleted. This function of the recordable time period calculating means 206 is not limited to the deletion of contents, and may be applied to the case where contents are overwritten. Further, the recordable time period calculating means 206 has a function of causing the storage information acquiring means 203 to detect the remaining recording capacity of a recordable region of the disk D during a recording operation, constantly calculating approximately how much recording time period is left from the detected remaining recording capacity using the presently set compression ratio, and notifying the display data generating means 202 when there is little remaining recording time period (i.e., when the remaining recording time period becomes less than a predetermined time period), thereby informing the user that there is little remaining recording time period. The apparatus information acquiring means 207 acquires information on the compression ratio that is presently set in the recording and reproducing apparatus.

The storage information acquiring means 203 acquires the contents information (file size, recording time length, compression ratio during recording, and so forth) of contents recorded on the disk D and the remaining recording capacity. The contents information is acquired from the TOC information mentioned earlier. The recordable time period calculating means 206 calculates a recordable time period from the compression ratio that is presently set, the contents information and the remaining recording capacity. The accumulating means 208 determines a total of the recordable time periods of contents of a plurality of specified files that have been calculated by the recordable time period calculating means 206.

More specifically, a total recording extension time period, which is the total of recording extension time periods of the contents of a file that has been specified for deletion, is found and the remaining recordable time period is added to this total recording extension time period due to the deletion of the contents. The time period found by the accumulating means 208 is displayed on the LCD unit 111 as the remaining recordable time period.

The display data generating means 202 generates display screen data for display on the LCD unit 111 in order to inform the user of the calculation result of the accumulating means 208, that is, the total of the calculation results of the recordable time period calculating means 206. By reflecting the display data generated by the display data generating means 202 on the LCD unit 111 in the display means 201, the contents of the display are updated.

Next, display screens during a reproduction operation by the recording and reproducing apparatus shown in FIGS. 1, 2, and 7 will be described.

Figure 3:
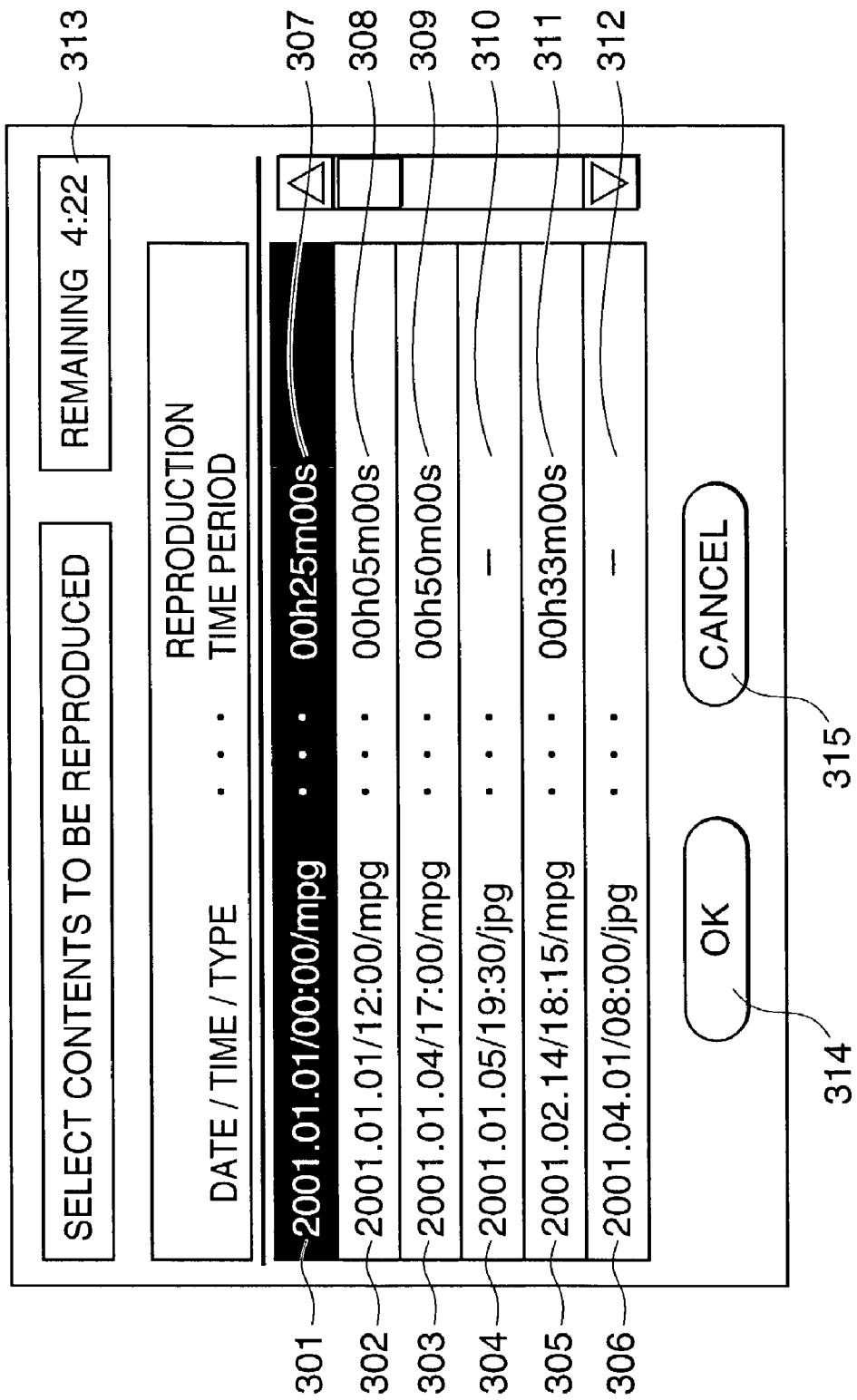
FIG. 3 is a diagram showing a reproducing file selection screen during a reproduction operation.

FIG. 3 shows a display screen for a file list that is displayed on the LCD unit 111 in the reproduction mode when contents to be reproduced are selected.

In FIG. 3, reference numerals 301 to 306 denote information indicative of the recording date and time and type of file for respective files. Reference numerals 307 to 312 denote information indicative of the actual reproduction time periods of the files, that is, indicating the reproduction time period taken when each file is actually reproduced. The reproduction time periods of "jpg" files 304 and 306 are not displayed, which means that these files are still images. By pressing the up part or down part of the cross button 112 on the recording and reproducing apparatus main body, the focus for the selected file (in FIG. 3, the information 301 is presently selected) is moved up or down so that the file to be reproduced can be selected.

Also, by pressing the left part or right part of the cross button 112, the focus can be switched between an "OK" button 314 and a "CANCEL" button 315 and when the user has made a decision for the reproduction, the "YES" button 113 is pressed with the focus on the "OK" button 314. After this, the selected contents are reproduced and a reproduced moving image is displayed in place of the list screen of FIG. 3.

In the case where the user does not intend to reproduce a file, when the "YES" button 113 is pressed with the focus on the CANCEL button 315, it is determined that reproduction is not desired and the reproducing file selection screen of FIG. 3 is cleared. Also, when a still image file has been selected, the still image is reproduced for a predetermined time period and after this the display switches back to the display screen of FIG. 3.

Next, a description will be given of a method of securing a recording capacity when there is little remaining recording capacity during a recording operation by the recording and reproducing apparatus shown in FIGS. 1, 2, and 7.

Figure 4:
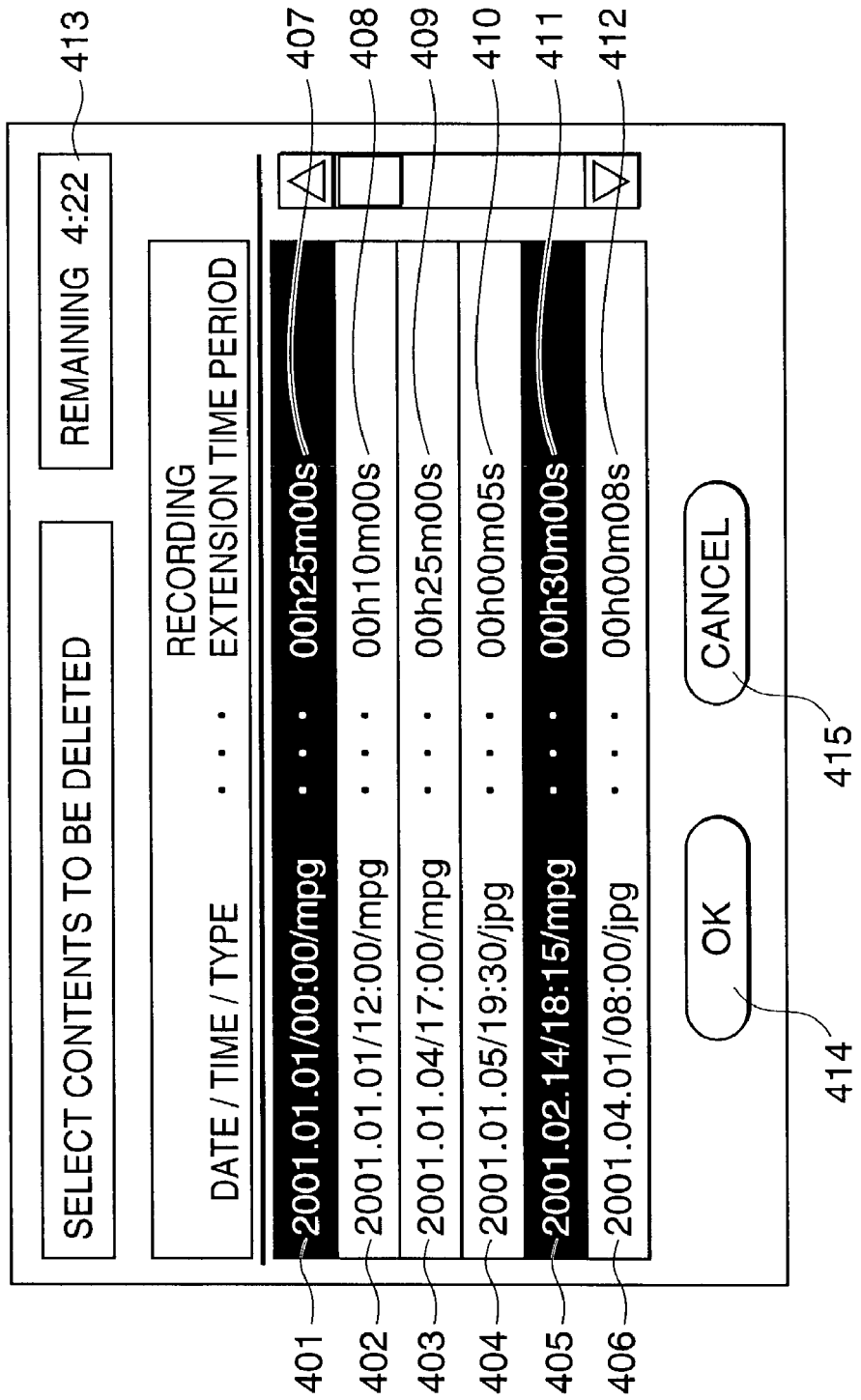
FIG. 4 is a diagram showing a deleting contents selection screen.

In the present embodiment, when there is little remaining recording capacity, an image being picked up is displayed in the viewfinder 105, a deleting contents selection screen shown in FIG. 4 is displayed on the LCD unit 111, and the user is requested to select the contents to be deleted.

The deleting contents selection screen shown in FIG. 4 will be described here.

In FIG. 4, reference numerals 401 to 406 denote information indicative of the shooting date and time, and data type of respective files. By displaying the shooting date and time in this way, it is possible to display when the contents were shot to the user in an easily understandable manner. Reference numerals 407 to 412 denote recording extension time period information indicative of a recording extension time period that can be expected at the presently set compression ratio when the contents of each file is deleted.

That is, the numerical values of hours, minutes and seconds over which the contents of each file can be recorded in terms of the data size of the contents of each file when recording is performed at the presently set compression ratio are displayed. An "OK" button 414 and a "CANCEL" button 415 are provided for making the final decision when the user selects the contents to be deleted, and by pressing the left part or right part of the cross button 112, it is possible to switch between states where the "OK" button 414 is selected, the "CANCEL" button 415 is selected, and neither button is selected.

In the case where the recordable time period is to be increased by deleting specified file contents, after specifying the contents to be deleted, the user presses the left part or right part of the cross button 112 to move the focus to the "OK" button 414 and then presses the "YES" button 113.

In the case where the recordable time period is not to be increased by deleting contents, the user moves the focus to the "CANCEL" button 415 and then presses the "YES" button 113.

In a state where neither the "OK" button 414 nor the "CANCEL" button 415 is selected, if the focus (the highlighted information 405 in FIG. 4) is moved to contents to be selected by pressing the up part or down part of the cross button 112 and the "YES" button 113 is then pressed, contents of a plurality of files can be selected (the information 401 and 405 in FIG. 4).

When the focus is moved back to contents of a file that have been selected and the "YES" button 113 is pressed, the contents are restored to the unselected state. When the "OK" button 414 is selected with contents of a plurality of files that have been selected and the "YES" button 113 is pressed, the contents of the plurality of files are deleted at the same time and a recording time period extension equal to a long time period can be acquired by a single operation.

On the remaining recording time period information 413, the recordable time period, which corresponds to the remaining recording capacity, for informing the user of the time period available before making a selection of contents of a file or files to be deleted, and an estimated time period, which is found by adding together the time period extension acquired by deletion of the specified file contents and the remaining recording time period found from the remaining recording capacity, are alternately displayed at intervals of a fixed time period.

Here, there are contents (308/408 and 309/409) whose time periods are different in the displays during reproduction and during recording shown in FIGS. 3 and 4 because the compression ratios used when recording these contents differ from the present compression ratio.

For example, while the contents corresponding to the information 308 were recorded at a data rate (compression ratio) of 12 Mbps during recording, the recording data rate (compression ratio) that is set presently is 6 Mbps, so that the compression ratio is higher than that used when the contents corresponding to the information 308 were recorded, which means that a larger increase in the data size can be expected with the same data size.

The contents corresponding to the time period information 310/410 and 312/412 are still image data, so that the reproduction time period for each pair of time period information is a predetermined time period. However, on the screen of FIG. 4 during recording, the time period for which the contents of each still image file can be recorded is displayed in terms of the time period for moving image data corresponding to the still image file data can be recorded. The difference between the time period information 410 and 412 is due to the difference in the data sizes caused by the angle of view and recording quality.

Next, the apparatus information that can be acquired by the apparatus information acquiring means 207 will be described. The apparatus information acquiring means 207 acquires the recording data rate (compression ratio) that is presently set, as a recording parameter. Next, the storage information that can be acquired by the storage information acquiring means 203 will be described. Two types of information can be acquired by the storage information acquiring means 203. One type of information that can be acquired is individual pieces of contents information that are recorded on the disk D, while the other type of information that can be acquired is information on the entire storage that indicates which regions of the storage are recordable regions.

Figures 5, 6:
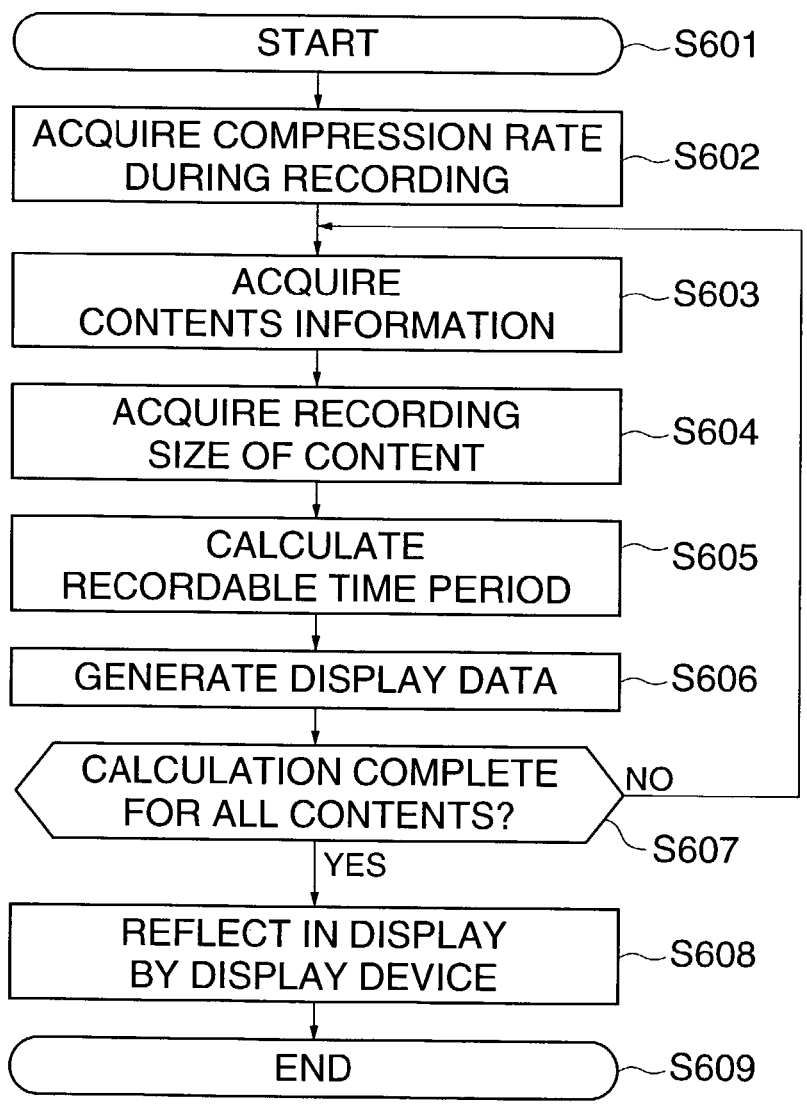
FIG. 5 is a diagram showing the structure of the contents information.
FIG. 6 is a flowchart showing a method of calculating the recording extension time period in the deleting contents selection screen that is displayed during recording when there is little remaining capacity on the recording disk.

FIG. 5 shows the structure of the contents information.

The contents information can be roughly classified into a recording date 501, a recording start time 502, and a recording time length 5z03, which are acquired from information recorded onto the disk D when recording is performed, and the type of contents (file) 504 and recording size 505 that can be read from the recorded contents per se. The recording date 501, the recording start time 502, and the file type 504 are used to display the contents, the recording size 505 is used to calculate the recording and reproducing time period, and the recording time length 503 is used in the display of the reproducing file selection screen. The total unrecorded regions of the storage can be acquired from the information on the entire storage.

Next, a process for calculating the recording extension time period in the deleting contents selection screen (FIG. 4) that is displayed when there is little remaining capacity on the disk D during recording will be described with reference to the flowchart in FIG. 6. The process in FIG. 6 is executed by the controller 1104 controlling the various functions of the display data generating means 202, the storage information acquiring means 203, the user input determining means 205, the recordable time period calculating means 206, the apparatus information acquiring means 207, and the accumulating means 208 of FIG. 2 based on a program.

In a step S601, the controller 1104 starts display control. Then, when it is determined in a step S602 that an instruction for displaying the deleting contents selection screen, information on the recording data rate (compression ratio) that is presently set is first acquired from the apparatus information acquiring means 207.

Then, in a step S603, contents information such as the data amount and recording time length of the contents of each of the files recorded on the disk D and the compression ratio during recording is acquired from the storage information acquiring means 203. After this, in a step S604, the data amount of the contents of a file to be deleted is extracted from the contents information acquired in the step S603.

Then, in a step S605, the recording extension time period (the possible extension in the recording time period due to the deletion of the contents) is calculated by the recordable time period calculating means 206 based on the data size of the contents of the file to be deleted that was extracted in the step S604 and the compression ratio acquired in the step S602. Calculation is performed according to the following equation as a calculation method of the recording extension time period.

Recording extension time period =contents data amount/ set compression ratio For example, when the presently set compression ratio is 6 Mbps and the data amount of the specified file contents is 5 Gbits, the recording extension time period can be calculated as 5×1000 Mb/6 Mbps=833.33 seconds.

That is, 833.3 seconds=13 minutes and 53 seconds.

The compression ratio may be a fixed bit rate or a variable bit rate, and in the case of the variable bit rate, calculation is performed using the average compression ratio over a fixed time period.

When the recordable time period for the disk D is calculated including an extension time period to be added due to the deletion or overwriting of contents of a certain file, the increase in recording capacity due to the deletion or overwriting of contents of the file on the disk D and the remaining recording capacity of the contents of all the other files recorded on the disk D are taken into consideration. The recordable time period is calculated by dividing the total of the data amount of the contents of the file to be deleted or overwritten and the remaining recording capacity of the contents of all the other files on the disk D by the compression ratio (the total of t the possible extension in the recording time period due to the deletion of the contents and the time period that can be recorded corresponding to the remaining recording capacity).

Then, in a step S606, data for a display screen is generated by the display data generating means 202. The generated display data is display data that can be actually displayed on the LCD unit 111 by the display means 201. The recording extension time period (407 to 412 in FIG. 4) displayed on the display screen of the LCD unit 111 is the recording extension time period for contents calculated in the step S605. Then, in a step S607, it is determined whether the calculation of the recording extension time period for the contents of all the files to be displayed on the LCD unit 111 has been completed.

Here, when there is contents of a file or files that are still to be displayed and for which the calculation of the recording extension time period has not been completed, the process returns to the step S603.

When the calculation of the recording extension time period has been completed for the contents of all files to be displayed, the process proceeds to a step S608. In the step S608, the LCD unit 111 is operated by the display means 201 to display the display data generated by the display data generating means 202 on the liquid crystal screen of the LCD unit 111. In the next step S609, the present display control is terminated.

By virtue of the above described process, it is possible to clearly inform the user, via the display of the LCD unit 111, of the recording extension time period that can be expected when the contents of each file is deleted or overwritten, which can be a significant help to the user when selecting the contents to be deleted or overwritten to extend the recording time period.

As described above, according to the present embodiment, when there is little remaining recording capacity on the disk D, the deleting contents selection screen is displayed to the user by the LCD unit 111 and contents that are not needed are selected by the user himself or herself, which makes it possible to prevent the conventional problems of the automatic deletion of contents that are important to the user and of the lowering of reproduction quality due to recompression.

Further, according to the present embodiment, for the same contents, the actual reproduction time period is displayed during reproduction, while, during recording, a recording extension time period that can be acquired at the compression ratio that is presently set is displayed. As a result, the time period information that the user wishes to know can be appropriately displayed in accordance with the recording mode and reproduction mode, providing the effect that the user can select appropriate contents to be deleted or overwritten in accordance with the desired extension in the recording time period.

Although in the present embodiment, contents are displayed in a list in the deleting contents selection screen, what is important in the present invention is that different types of time periods related to contents are displayed in the reproduction mode and in the recording mode, respectively, that is, the actual reproduction time period is displayed during reproduction and the recording extension time period that can be acquired at the present compression ratio due to deletion or overwriting of the specified contents is displayed during recording. As a result, the time period information that the user wishes to know can be appropriately displayed in each of the recording mode and the reproduction mode. Therefore, it does not matter whether thumbnails, graphs, tree structure diagrams, etc., are used as the representation method for displaying contents.

Moreover, the present invention may be applied to any type of recording and reproducing apparatus which can record contents on a randomly accessible recording medium such as a video recorder using a disk-type recording medium, insofar as the recording and reproducing apparatus can acquire a required recording capacity by deleting existing contents during recording.

Further, although in the above embodiment, contents to be deleted are selected based on the correspondence between the information for specifying contents and the recording extension time periods in the deleting contents selection screen of FIG. 4, contents to be overwritten may be selected in the deleting contents selection screen of FIG. 4.

Still further, although in the above embodiment, the recording extension time period (the time period by which recording can be extended by deleting or overwriting contents) is displayed in the deleting contents selection screen of FIG. 4, the present invention may be applied to a display method of displaying the recordable time period (the total of the time period by which recording can be extended due to deletion or overwriting of contents and the time period for which recording is possible corresponding to the remaining recording capacity), or a display method of simultaneously displaying the above recording extension time period and the recordable time period.

Although in the above embodiment, the present invention is applied to a recording and reproducing apparatus having a recording function and a reproducing function, the present invention may be applied to a recording apparatus having a recording function alone, providing substantially the same effects as described above.

The present invention may also be applied to a system composed of a plurality of apparatuses or to a single apparatus.

It is to be understood that the object of the present invention may also be accomplished by supplying a system or an apparatus with a storage medium, in which a program code of software which realizes the functions of the above described embodiment is stored, and causing a computer (or CPU or MPU) of the system or apparatus to read out and execute the program code stored on the storage medium.

In this case, the program code itself read out from the storage medium realizes the functions of the embodiment described above, and hence the storage medium on which the program code is stored constitutes the present invention.

Examples of the storage medium for supplying the program code include a floppy (registered trademark) disk, a hard disk, an optical disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively to a storage medium, a download via a network may be used for supplying the program code.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing the program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A recording apparatus for recording first information data on a non-transitory recording medium which includes already-recorded information data, said recording apparatus comprising:
  a setting device that sets a recording compression mode of the first information data, the recording compression mode being selected from a plurality of different recording compression modes;
  a detecting device that detects a degree of extension of recordable time achievable by deleting the already-recorded information data, based on the recording compression mode set by said setting device for the first information data, before the already-recorded information data is deleted; and
  a display device that displays recordable time period information indicative of the degree of extension of recordable time detected by said detecting device, before the already-recorded information data is deleted.

2. A recording apparatus according to claim 1, further comprising a compressing device that compresses an information quantity of the first information data,
  wherein said compressing device determines a compression ratio based on the recording compression mode set by said setting device.

3. A recording apparatus according to claim 1, wherein said detecting device further determines a remaining time period based on the recording compression mode set by said setting device and recording remaining amount information indicative of a recording remaining amount of the non-transitory recording medium, and
  wherein said display device further displays remaining time period information indicative of the remaining time period.

4. A recording apparatus according to claim 3, wherein said display device displays the recordable time period information and the remaining time period information in a predetermined display format.

5. A recording apparatus according to claim 1, further comprising a selecting device that selects any one of a plurality of pieces of the already-recorded information data,
  wherein said detecting device further detects, when the any one of the plurality of pieces of already-recorded information data is selected by said selecting device, a total time period, based on (a) a recording remaining amount, (b) another recording amount acquired by deletion of the selected already-recorded information data, and (c) the recording compression mode set by said setting device, and
  wherein said display device displays the total time period detected by said detecting device.

6. A recording apparatus according to claim 1, wherein said display device displays the recordable time period information indicative of the detected extension recordable time period corresponding to each of the plurality of pieces of already-recorded information data.

7. A recording apparatus according to claim 1, further comprising a reproducing device that reproduces the information data from the non-transitory recording medium, wherein said display device has a first display mode in which reproduction time period information indicative of a reproduction time period of the information data recorded on the non-transitory recording medium is displayed, and a second display mode in which the extension of recordable time period information indicative of the extension of recordable time period, when deleting the information data recorded on the non-transitory recording medium, is displayed.

8. A recording apparatus according to claim 7, further comprising a mode setting device that selectively sets an operation mode of the recording apparatus from amongst (a) a recording mode and (b) a reproduction mode,
wherein said display device performs display in the first display mode when said mode setting device has set the reproduction mode and performs display in the second display mode when said mode setting device has set the recording mode.

9. A recording apparatus according to claim 1, wherein said detecting device includes a reproducing device that reproduces, from the non-transitory recording medium, management information related to data recorded on the non-transitory recording medium, and
wherein said detecting device detects the information quantity of the data recorded on the non-transitory recording medium based on the reproduced management information.

10. A recording apparatus according to claim 1, wherein the information data includes image data.

11. An apparatus-implemented recording method of recording first information data on a non-transitory recording medium which includes already-recorded information data, said recording method comprising:
a setting step of setting a recording compression mode of the first information data, the recording compression mode being selected from a plurality of different recording compression modes;
a detecting step of detecting a degree of extension of recordable time achievable by deleting the already-recorded information data, based on the recording compression mode set in said setting step for the first information data, before the already-recorded information data is deleted; and
a display step of displaying recordable time period information indicative of the degree of extension of recordable time detected in said detecting step, before the already-recorded information data is deleted.

12. A non-transitory computer-readable storage medium storing a computer-readable program for causing a computer to implement a recording method of recording first information data on a non-transitory recording medium which includes already-recorded information data, the program comprising:
a setting module for setting a recording compression mode of the first information data, the recording compression mode being selected from a plurality of different recording compression modes;
a detecting module for detecting a degree of extension of recordable time achievable by deleting the already-recorded information data, based on the recording compression mode set by said setting module for the first information data, before the already-recorded information data is deleted; and
a display module for displaying recordable time period information indicative of the degree of extension of recordable time detected by said detecting module, before the already-recorded information data is deleted.

13. A recording apparatus for recording first information data on a non-transitory recording medium, said recording apparatus comprising:
a setting device that sets a recording compression mode of the first information data, the recording compression mode being selected from a plurality of different recording compression modes;
a detecting device that detects a recordable time period extendable by deleting user-specified information data, separate from the first information data, that has already been recorded on the non-transitory recording medium, based on (i) the recording compression mode set by said setting device for the first information data and (ii) an information quantity of the user-specified information data; and
a display device that displays recordable time period information indicative of the recordable time period detected by said detecting device, before the user-specified information data is deleted.

14. A recording apparatus according to claim 13, wherein said detecting device detects, when the user-specified information is deleted, a total time period during which the first information data can be recorded on the non-transitory recording medium at the recording compression mode set by said setting device, and
wherein said display device displays the total time period before the user-specified information data is deleted.

15. A recording apparatus for recording first information data on a non-transitory recording medium, said recording apparatus comprising:
a setting device that sets a recording compression mode of the first information data, the recording compression mode being selected from a plurality of different recording compression modes;
a detecting device that detects a recordable time period extendable by deleting displayed information data, separate from the first information, that has already been recorded on the non-transitory recording medium, based (i) on the recording compression mode set by said setting device for the first information data and (ii) an information quantity of the displayed information data; and
a display device that displays recordable time period information indicative of the recordable time period detected by said detecting device, before the displayed information data is deleted.

16. A recording apparatus according to claim 15, wherein said detecting device detects, when the displayed information is deleted, a total time period during which the first information data can be recorded on the non-transitory recording medium at the recording compression mode set by said setting device, and
wherein said display device displays the total time period before the displayed information data is deleted.

17. A recording apparatus according to claim 14, wherein said display device alternately displays the total time period and the recordable time period.

18. A recording apparatus according to claim 16, wherein said display device alternately displays the total time period and the recordable time period.

19. A recording apparatus according to claim 13, further comprising a compressing device that compresses an information quantity of the first information data,
wherein said compressing device determines a compression ratio based on the recording compression mode set by said setting device.

20. A recording apparatus according to claim 13, wherein said detecting device further determines a remaining time period based on the recording compression mode set by said setting device and recording remaining amount information indicative of a recording remaining amount of the non-transitory recording medium, and
    wherein said display device further displays remaining time period information indicative of the remaining time period.

21. A recording apparatus according to claim 20, wherein said display device displays the recordable time period information and the remaining time period information in a predetermined display format.

22. A recording apparatus according to claim 13, wherein said display device displays, together with information indicative of the first information data, the recordable time period information indicative of the detected recordable time period to be extended corresponding to each of the plurality of pieces of already-recorded information data.

23. A recording apparatus according to claim 13, further comprising a reproducing device that reproduces the information data from the non-transitory recording medium,
    wherein said display device has a first display mode in which reproduction time period information indicative of a reproduction time period of the information data recorded on the non-transitory recording medium is displayed, and a second display mode in which the recordable time period information related to the information data recorded on the non-transitory recording medium is displayed.

24. A recording apparatus according to claim 23, further comprising a mode setting device that selectively sets an operation mode of the recording apparatus from amongst (a) a recording mode and (b) a reproduction mode,
    wherein said display device performs display in the first display mode when said mode setting device has set the reproduction mode and performs display in the second display mode when said mode setting device has set the recording mode.

25. A recording apparatus according to claim 13, wherein said detecting device includes a reproducing device that reproduces, from the non-transitory recording medium, management information related to data recorded on the non-transitory recording medium, and
    wherein said detecting device detects the information quantity of the data recorded on the non-transitory recording medium based on the reproduced management information.

26. A recording apparatus according to claim 13, wherein the information data includes image data.

27. A recording apparatus according to claim 15, further comprising a compressing device that compresses an information quantity of the first information data,
    wherein said compressing device determines a compression ratio based on the recording compression mode set by said setting device.

28. A recording apparatus according to claim 15, wherein said detecting device further determines a remaining time period based on the recording compression mode set by said setting device and recording remaining amount information indicative of a recording remaining amount of the non-transitory recording medium, and
    wherein said display device further displays remaining time period information indicative of the remaining time period.

29. A recording apparatus according to claim 28, wherein said display device displays the recordable time period information and the remaining time period information in a predetermined display format.

30. A recording apparatus according to claim 15, further comprising a selecting device that selects any one of the plurality of pieces of already-recorded information data,
    wherein said detecting device further detects, when the any one of the plurality of pieces of already-recorded information data is selected by said selecting device, a total time period during which the first information data can be recorded at the recording compression mode set by said setting device, based on (a) a recording remaining amount and (b) another recording amount acquired by deletion of file contents of the non-transitory recording medium corresponding to the selected one of the plurality of pieces of already-recorded information data, and
    wherein said display device displays the total time period detected by said detecting device.

31. A recording apparatus according to claim 15, wherein said display device displays, together with information indicative of the first information data, the recordable time period information indicative of the detected recordable time period to be extended corresponding to each of the plurality of pieces of already-recorded information data.

32. A recording apparatus according to claim 15, further comprising a reproducing device that reproduces the information data from the non-transitory recording medium,
    wherein said display device has a first display mode in which reproduction time period information indicative of a reproduction time period of the information data recorded on the non-transitory recording medium is displayed, and a second display mode in which the recordable time period information related to the information data recorded on the non-transitory recording medium is displayed.

33. A recording apparatus according to claim 32, further comprising a mode setting device that selectively sets an operation mode of the recording apparatus from amongst (a) a recording mode and (b) a reproduction mode,
    wherein said display device performs display in the first display mode when said mode setting device has set the reproduction mode and performs display in the second display mode when said mode setting device has set the recording mode.

34. A recording apparatus according to claim 15, wherein said detecting device includes a reproducing device that reproduces, from the non-transitory recording medium, management information related to data recorded on the non-transitory recording medium, and
    wherein said detecting device detects the information quantity of the data recorded on the non-transitory recording medium based on the reproduced management information.

35. A recording apparatus according to claim 15, wherein the information data includes image data.

36. A recording apparatus that records information data at different selectable compression modes comprising:
    means for detecting a data size of a file stored on a non-transitory storage medium, wherein the file comprises image data;
    means for determining, before deletion of the file, an amount of recording time that deletion of the file would make available for recording on the storage medium at a compression mode set for first information data;
    means for displaying, on a display device before deletion of the file, the amount of recording time that deletion of the file would make available for recording on the storage medium at the compression mode set for the first information data, as determined by said determining means;

means for providing a user interface allowing a user to select the file for deletion; and means for deleting the file from the storage medium in response to selection of the file by the user using the user interface.

37. An apparatus according to claim 36, wherein said apparatus is configured such that, in the case where a plurality of files are stored on the storage medium, (a) said displaying means displays, for each of the plurality of files, the determined amount of recording time that deletion of the file would make available, and (b) said means for providing a user interface allows the user to select plural files together for deletion.

38. An apparatus according to claim 36, wherein said displaying means further displays a shooting date and time for the file and whether the file is a still image file or a moving image file.

39. An apparatus according to claim 36, wherein in the case where a plurality of files are stored on the storage medium, said displaying means displays for each of the plurality of files (a) the determined amount of recording time that deletion of the file would make available, (b) a shooting date and time for the file, and (c) information showing whether the file is a moving image file, and said means for providing a user interface allows the user to select plural files together for deletion.

* * * * *